(12) United States Patent
O'Donnell

(10) Patent No.: US 7,257,661 B2
(45) Date of Patent: Aug. 14, 2007

(54) SCALABLE HOME CONTROL PLATFORM AND ARCHITECTURE

(75) Inventor: Ciaran Gerard O'Donnell, Santa Clara, CA (US)

(73) Assignee: NXP B.V., Eindhoven (NL)

( * ) Notice: Subject to any disclaimer, the term of this patent is extended or adjusted under 35 U.S.C. 154(b) by 785 days.

(21) Appl. No.: 09/961,125

(22) Filed: Sep. 21, 2001

(65) Prior Publication Data
US 2003/0061427 A1   Mar. 27, 2003

(51) Int. Cl.
*G06F 13/40* (2006.01)
(52) U.S. Cl. ........................ 710/305; 710/307
(58) Field of Classification Search ................ 710/300, 710/100, 305, 107, 113, 117, 240–241; 709/104
See application file for complete search history.

(56) References Cited

U.S. PATENT DOCUMENTS

| | | | | |
|---|---|---|---|---|
| 4,852,089 A | * | 7/1989 | Berry et al. | 370/468 |
| 5,471,474 A | * | 11/1995 | Grobicki et al. | 370/437 |
| 5,991,292 A | * | 11/1999 | Focsaneanu et al. | 370/352 |
| 6,020,931 A | * | 2/2000 | Bilbrey et al. | 348/584 |
| 6,038,625 A | * | 3/2000 | Ogino et al. | 710/104 |
| 6,160,796 A | * | 12/2000 | Zou | 370/257 |
| 6,374,404 B1 | * | 4/2002 | Brotz et al. | 725/46 |
| 6,452,935 B1 | * | 9/2002 | Gibbs | 370/439 |
| 6,539,450 B1 | * | 3/2003 | James et al. | 710/306 |
| 6,557,069 B1 | * | 4/2003 | Drehmel et al. | 710/307 |
| 6,769,046 B2 | * | 7/2004 | Adams et al. | 710/316 |
| 7,085,875 B1 | * | 8/2006 | Yona et al. | 710/307 |

FOREIGN PATENT DOCUMENTS

EP   1146429 A1 *  10/2001

* cited by examiner

*Primary Examiner*—Paul R. Myers

(57) ABSTRACT

A home-control platform and architecture includes a plurality of serial buses that provide communications among processing devices that are connected to the home-control platform. A bus control unit is configured to allocate the buses among the devices that request communications services. The platform supports one or more control processors that provide an interface to legacy devices, user and network interfaces, browsers, and the like. The platform also accepts optional plug-in cards that perform as coprocessors for specific tasks, such as MPEG encoding and decoding, signal processing, video and audio CODECs, and so on. The software architecture employed to support this platform includes the use of a real-time microkernel Operating System (OS) at the control processors that interfaces with the task coprocessors, and interfaces with a standard OS, such as Vxworks, WinCE, or LINUX. The microkernel OS provides primitives for task memory and CPU space isolation, virus protection, and secure financial transaction services.

5 Claims, 2 Drawing Sheets

SCALABLE HOME CONTROL PLATFORM AND ARCHITECTURE

BACKGROUND OF THE INVENTION

1. Field of the Invention

This invention relates to the field of computer systems, and in particular to a platform and architecture for providing a scalable home-control system and network.

2. Description of Related Art

Conventional home-control systems are not inherently scalable. As advanced applications for multi-media, high-speed distributed Internet access, integrated applications, and the like, become commonplace, the conventional home-control systems are likely to be incapable of providing the bandwidth and flexibility required to fully support these applications.

A conventional PC architecture includes a bus structure for transferring data in parallel among a variety of functional boards. For example, the PCMCIA standard interface includes a 16 or 32 bit wide data interface, and a 26 bit wide address interface, plus various control lines. While one device is using the interface, other devices are effectively prevented from using the interface. Time division multiplexing is often used to provide the appearance of multiple simultaneous access to the interface, but if a particular transfer is time-sensitive, a time division multiplexing scheme may not provide a sufficient number of time-slots for the application. In like manner, if the use of a 24-bit word becomes commonplace in the future, the use of a 16 or 32 bit wide data interface can incur a substantial overhead inefficiency.

Conventional PC architectures also require a substantial investment in the particular interface protocol, including a substantial learning-curve to master each of the evolving standards. As such, the introduction of potentially more efficient processing technologies is often stymied by a reluctance to abandon the existing interface technologies. For example, the aforementioned 24-bit word structure may prove to be a very effective structure for RGB video applications, but the costs of adopting a corresponding 24-bit interfacing architecture may delay the adoption of this structure, particularly if a substantial investment of time or money has been made in the existing 16 or 32 bit standards. Thereafter, there will be a similar reluctance to change from this example 24-bit structure.

Similarly, conventional home-control architectures are designed to accommodate a variety of applications, some of which may have substantially different interfacing requirements. For example, a system that is designed exclusively for providing a home with distributed multimedia entertainment will have substantially different requirements than a system that is designed exclusively to provide the home with comfortable heating and air-conditioning. A conventional home-control architecture will typically be designed for the higher set of design requirements, and overdesigned for the devices having a lesser set of design requirements. When a next-generation set of devices become available, either the system will not be able to accommodate these devices, because the aforementioned higher set of requirements did not anticipate this new set of devices, or, the system will be able to accommodate the devices, thereby implying that the system had been overdesigned for the prior generation of devices.

Therefore, a need exists for a home-control platform and architecture that allows for changes in the future use of the home-control platform, without introducing a substantial design change to accommodate this future use, and without requiring a precise definition or estimation of what these future changes may entail. Such a home-control platform is characterized as a "scalable" home-control platform, having an architecture that is efficient for a wide range of applications.

BRIEF SUMMARY OF THE INVENTION

It is an object of this invention to provide a scalable home-control platform. It is a further object of this invention to provide a scalable home-control platform that uses the same interface protocol, regardless of the scale of the applications supported by the platform. It is a further object of this invention to provide an architecture for a home-control platform that can be expected to accommodate a wide variety of existing and future applications.

These objects, and others, are achieved by providing a home-control platform and architecture that includes a plurality of serial buses that provide communications among processing devices that are connected to the home-control platform. A bus control unit is configured to allocate the buses among the devices that request communications services. The platform supports one or more control processors that provide an interface to legacy devices, user and network interfaces, browsers, and the like. The platform also accepts optional plug-in cards that perform as coprocessors for specific tasks, such as MPEG encoding and decoding, signal processing, video and audio CODECs, and so on. The software architecture employed to support this platform includes the use of a real-time microkernel Operating System (OS) at the control processors that interfaces with the task coprocessors, and interfaces with a standard OS, such as Vxworks, WinCE, or LINUX. The microkernel OS provides primitives for task memory and CPU space isolation, virus protection, and secure financial transaction services.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
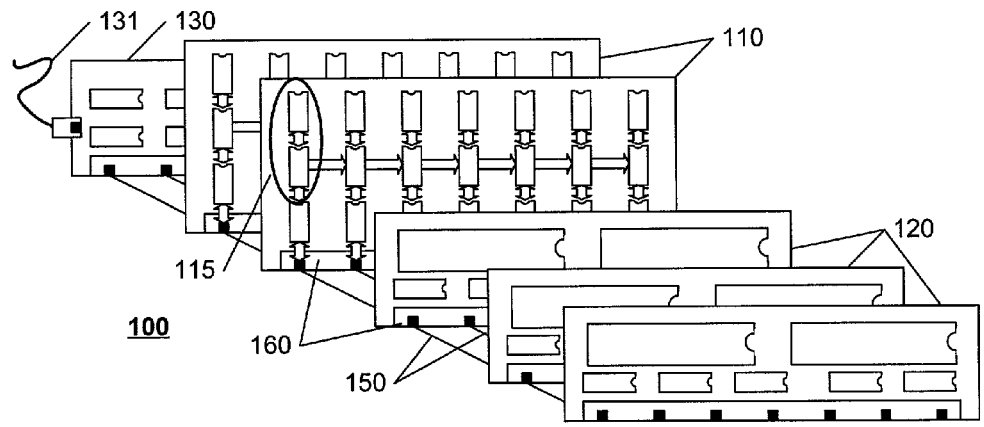
FIG. 1 illustrates an example block diagram of a home control platform in accordance with this invention.

FIG. 1 illustrates an example block diagram of a home control platform 100 in accordance with this invention. The platform 100 provides a structure and architecture for allowing processing units 110, control processors 120, and ancillary units 130 to efficiently transfer and process data, via a plurality of high-speed serial buses 150. In accordance with one aspect of this invention, the serial buses are preferably self-timed, thereby providing for scalability of bandwidth and data throughput.

Each device that is coupled to the home control platform 100 includes a bus interface unit 160 that is configured to send and/or receive data via a select one or more of the serial buses 150. The bus interface unit 160 provides conversion to and from the serial format of the bus 150 from and to parallel formats, as required, as well as bus arbitration and routing. In a preferred embodiment, the bus interface unit 160 supports direct memory access (DMA) copying. Also in a preferred embodiment, the buses 150 are extendable. The ancillary unit 130 includes, for example, an electro-optic coupling device that allows an extension of the platform 100 to another bank of devices 110, 120, 130 via optical fiber 131. A corresponding unit 130 on the other bank of devices 110, 120, 130 provides the interface to the corresponding plurality of serial buses on the other bank.

Figure 2:
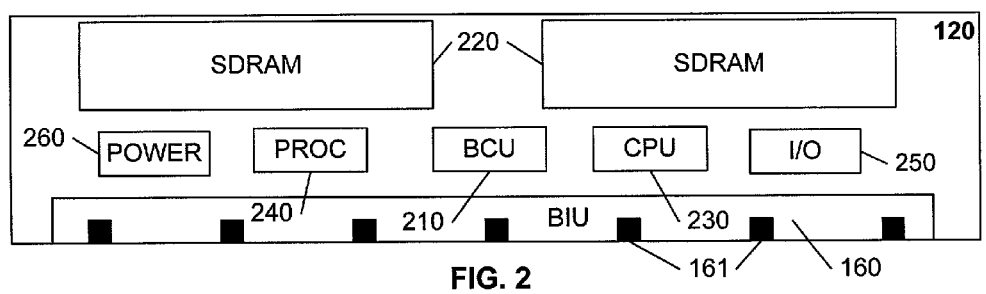
FIG. 2 illustrates an example block diagram of a control processor for use in a home control platform in accordance with this invention.

FIG. 2 illustrates an example block diagram of a control processor 120 for use in a home control platform in accordance with this invention. As illustrated, the bus interface unit (BIU) 160 includes connections 161 for connecting to serial buses 150 of FIG. 1. The processor 120 of this example includes a bus control unit (BCU) 210 that is configured to control the allocation of buses 150 among the individual devices 110, 120, 130 of FIG. 1. In a preferred embodiment of this invention, one of the buses 150 is dedicated to this control function. A device that needs access to one or more of the remaining buses 150 communicates an allocation request to the bus control unit 210 via the dedicated control bus. In response to this allocation request, the bus control unit 210 allocates one or more of the buses 150 to the requesting unit, and communicates the allocation to the requesting device via the dedicated control bus.

Any of a variety of conventional techniques may be used to provide this allocation. In a straightforward embodiment, a first-come first-served allocation procedure may be used. Other allocation techniques may include quality-of-service (QoS) allocations and the like that are designed to provide each device at least some agreed upon minimum allocation, and additional allocations if currently available. Some applications, such as real-time video processing, may be allocated using an all-or-nothing policy, wherein resources are not allocated until the total amount of requested resources is available.

In a conventional parallel-bus architecture, only one device may communicate on the bus at a time. As such, each device is allocated the same resource, the single parallel-bus. Thus, a low-bandwidth application, such as text processing or alarm monitoring, necessarily 'interferes' with a high-bandwidth application, such as video processing, in a parallel-bus architecture, because each allocation of the bus to the low-bandwidth application prevents an allocation to the high-speed application. Generally, systems that employ a parallel-bus arrangement are designed to provide sufficient buffering to assure that the 'interference' has no effect on the performance of each application. That is, although the high-bandwidth application must relinquish the parallel-bus for each communication by the low-bandwidth application, the parallel-bus based high-bandwidth application will be configured to provide sufficient buffering to allow 'gaps' in its access to the parallel-bus. When a parallel-bus system becomes saturated, however, with increasing bandwidth requirements of applications, the interference caused by the sharing of the common bus becomes apparent. Conventional PC-based video applications, for example, often 'freeze' when other applications are accessing the bus and the video application has exhausted its buffered frames. As applications continue to be made available for consumers that require increasing bandwidth, the parallel-bus architecture is bound to be found lacking when its saturation point is reached.

Because the allocation of communication resources in this invention is based on the individual serial buses 150, a resource allocation for one application can be accommodated without impacting other allocations. That is, for example, assume that ten buses 150 are available for allocation, and a real-time video processing application has been allocated eight of these buses to provide parallel processing for the application via the eight paralleled serial buses 150. Two buses remain available for allocation to other applications. As each application requests an allocation, the bus control unit 210 allocates these remaining two serial buses. If the subsequent applications request more resources than are available between these two serial buses, these two serial buses will be saturated, and requests will be denied. However, the saturation of these two serial buses will have no effect on the video processing application that has been allocated the other eight serial buses. Such an isolation is difficult to achieve in a parallel-bus architecture, because a sharing of resources, and a sharing of the impact of having insufficient resources, is inherent in a system that must allocate a single resource (the parallel-bus) among different applications. The number of serial buses 150 determines the degree of isolation that can be provided, as is an architectural parameter that is based on an estimate of a peak throughput requirement. In a preferred embodiment, at least sixteen serial buses 150 are provided.

In a preferred embodiment of this invention, the control processor 120 includes a conventional microprocessor architecture to allow existing software to be run, including a browser, network interface management, protocol stacks, and so on. A typical control processor 120 includes memory resources as required, typically in the form of one or more banks of SDRAM 220. As in a conventional microprocessor system, the control processor 120 includes a central processing unit (CPU) 230, one or more coprocessors 240, and an input/output (I/O) interface 250. In a preferred embodiment, a control processor 120, or an ancillary device 130 (in FIG. 1) includes a power module 260 that is configured to provide regulated power to other devices 110, 120, 130 within the platform 100. Also in a preferred embodiment, the devices 110, 120, 130, are each configured to allow for a "hot" plug-in of the device 110, 120, 130, so that a device 110, 120, 130 can be added or removed from the platform 100 without stopping the operation of the platform 100 and the existing devices 110, 120, 130. The connector that is used to connect each device 110, 120, 130 to the platform 100 facilitates the hot plug-in of the device 110, 120, 130, such as the EuroCard 96-wire connector.

Figure 3:
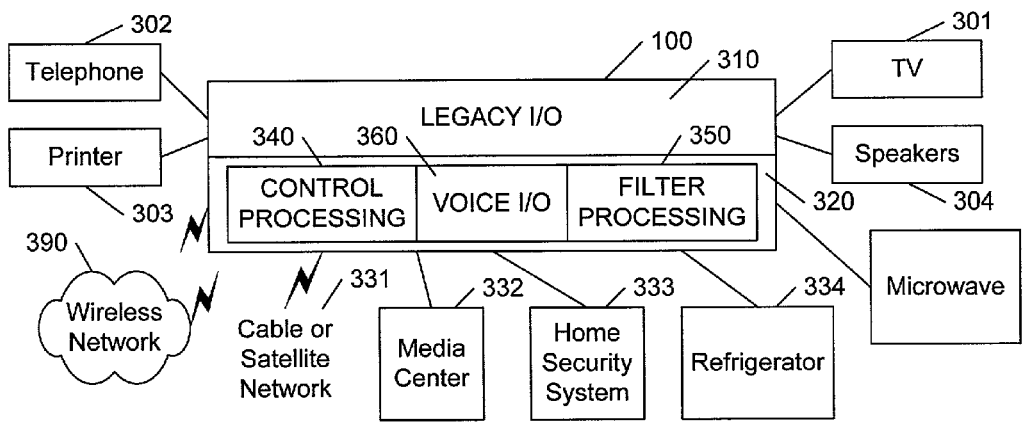
FIG. 3 illustrates an example block diagram of a system architecture of a home control platform in accordance with this invention.

FIG. 3 illustrates an example block diagram of a system architecture of a home control platform 100 in accordance with this invention. Of primary importance, the home control platform 100 is configured to support "legacy" devices, such as devices that are currently coupled to existing home control networks. One or more of the devices 110, 120, 130 that are coupled to the home control 100 are preferably configured to provide support to these legacy devices, such as existing televisions 301, telephones 302, and so on 303, 304.

The legacy I/O components 310 of the platform 100 supports the legacy peripherals 301-304 by providing such services as e-mail and basic home-control functions for these peripherals 301-304.

The additional components 320 provide the added value of the platform 100 for integrating and supporting current and future applications. For example, the addition of an interface (modem or tuner) to a cable or satellite network 331 allows the user to download video-on-demand programs for viewing on the legacy television 301. In like manner, providing an interface to a media center 332 to the platform 100 allows the media center 332 to use the existing legacy speakers 304. Similarly, providing support for a home security system 333 allows the security system 333 to potentially monitor the status of legacy systems, as well as systems designed to interface with the platform 100, such as the media center 332. For example, the refrigerator 334 may be configured to sound an alarm, via the home security system 333, if the temperature gradient indicates a progression toward particular high or low temperature limits. An interface to a wireless network 390 allows users to enter the home control network using portable devices, such as notebook computers, cell phones, and personal-data-assistants (PDAs).

The components 320 are illustrated in FIG. 3 as including control processing components 340, filter processing components 350, and voice input/output components 360. Other components for addition to a home control system will be evident to one of ordinary skill in the art in view of this disclosure. The control processing components include the functions and capabilities discussed above with regard to the example control processor 120 of FIG. 2, and as discussed further below with regard to the example software architecture of FIG. 5. The filter processing components 350 include components that are configured to provide special-purpose processing of data, typically under control of control processing components 340, as discussed further below with regard to the processing unit 110 of FIG. 4.

In a preferred embodiment, the user interaction with the home control platform 100 is via vocal input and output, using the voice I/O components 360. These components 360 include, for example, a conventional voice synthesizer application that runs on a control processor 120 of FIGS. 1 and 2, using processing units 110 and ancillary units 130 as required to effectively process and communicate the vocal output to the user. In like manner, the components 360 include the control, processing, and ancillary units 120, 110, 130 that are configured to effect voice recognition functions to allow the user to communicate with the system 100 via vocal input.

Figure 4:
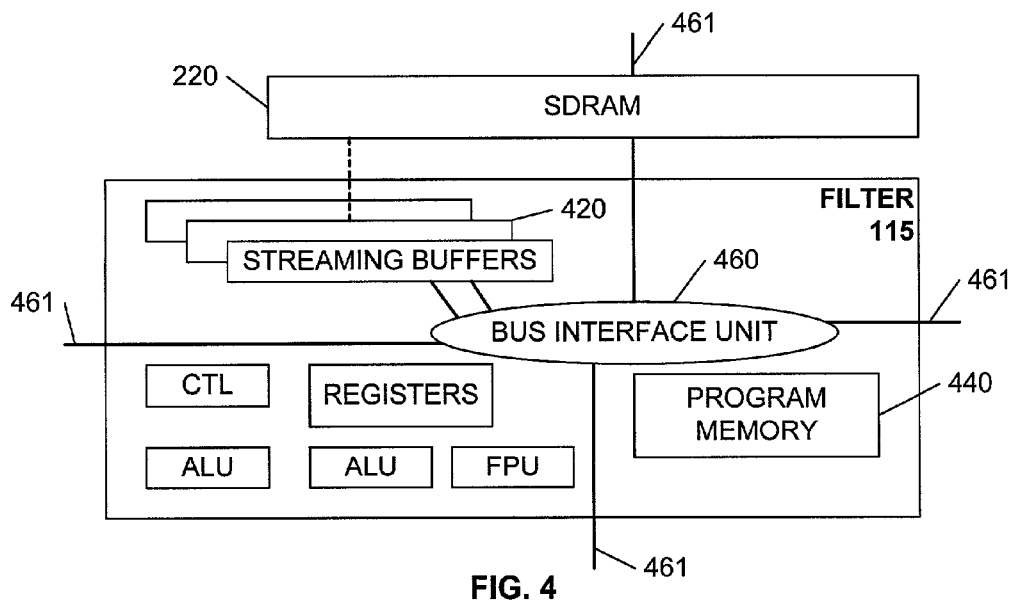
FIG. 4 illustrates an example block diagram of a filter processor for use in a home control platform in accordance with this invention.

FIG. 4 illustrates an example block diagram of a filter processor 115 for use in a home control platform 100 in accordance with this invention. As illustrated in FIG. 1, a processing unit 110 typically includes a plurality of filter processors 115, arranged in a routing matrix. Such a matrix is particularly useful for bit-slice and pipeline architectures, wherein each filter processor 115 performs a particular task on a data item, then passes it to the next filter processor 115 in 'lock-step' fashion. While the data item is being processed, parameters required for the processing of the next data item are obtained from the corresponding serial bus 150. In like manner, after processing each data item, the processed data item can be communicated to other devices via the corresponding serial bus 150. This is illustrated conceptually by the communication paths 461 emanating from the bus interface unit 460 of FIG. 4. The bus interface unit 460 is used to illustrate the subset of the bus interface unit 160 of the processing unit 110 of FIG. 1 that is allocated to the particular filter 115 by the bus control unit 210 of FIG. 2, discussed above.

Filter units 115 may be programmable, using the program memory 410, or dedicated, or a combination of both. A dedicated filter unit 115 is specialized for a particular application, such as an MPEG encoding or decoding application. Generally, the programmable filter units 115 have limited instruction sets dedicated to signal processing functions, such as compression and decompression (variable-length encoding and decoding (VLE, VLD)), the kernel functions (fast Fourier transform (FFT), discrete cosine transform (DCT), etc.) of video and audio coders and decoders (CODECs), and other special-purpose processing functions.

Preferably, each filter unit 115 is paired with an SDRAM 220, which is typically included at the control processor 120 (see FIG. 2) that is hosting the application that is using the filter unit 115. For example, a control processor 120 may be hosting an MPEG-video application, and, to effect the video decoding of the MPEG, calls upon a group of filter units 115 to process the MPEG data that is contained in the SDRAM 220. The filter units 115 in turn provide the decoded data to the SDRAM 220. For efficient communication of data to and from the SDRAM 220 via the bus interface unit 460, a multiple buffer ring is used, comprising a plurality of streaming buffers 420, as indicated by the dashed line connecting the SDRAM 220 to the buffers 420. Alternatively, processing intensive tasks, such as media processing, may be performed almost entirely at the processing units 110. In such an embodiment, the processing units 110 will preferably contain both the filter units 115 and the SDRAM.

Figure 5:
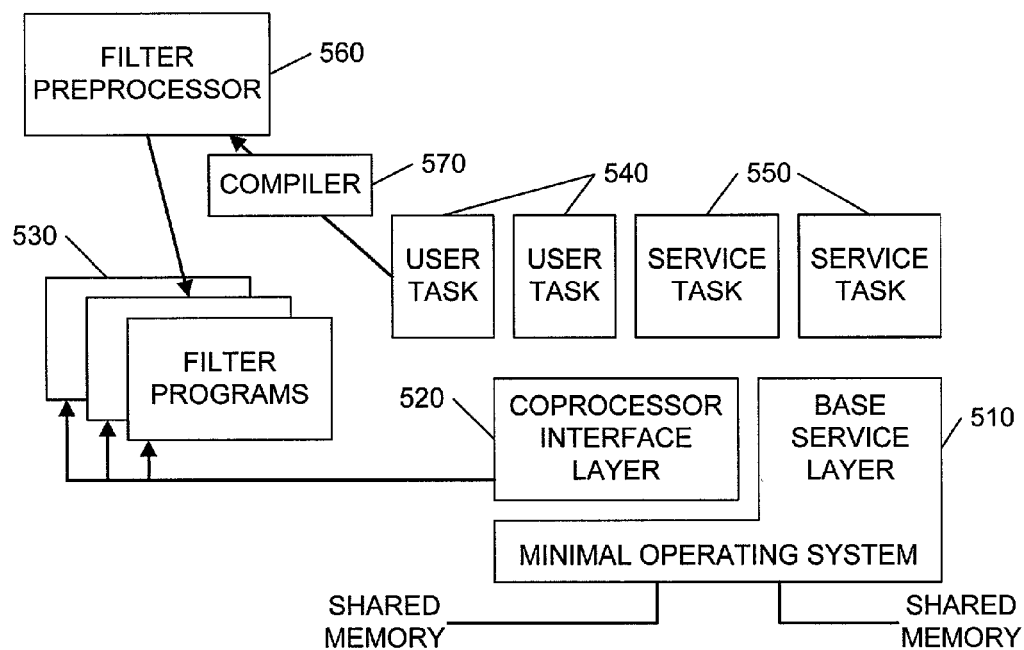
FIG. 5 illustrates an example block diagram of a software architecture of a home control platform in accordance with this invention.

FIG. 5 illustrates an example block diagram of a software architecture of a home control platform in accordance with this invention. Each control processor 120 of FIG. 1 includes a small real-time microkernel 510 that provides at least minimal operating system functions, including semaphores, messaging, scheduling, exception and task and memory management. Preferably, the microkernel 510 also includes primitives for task memory and CPU space isolation, virus protection, and secure financial transaction services. Standard operating systems, such as Vxworks, WinCE, or LINUX, preferably interface at the microkernel 510 layer, rather than the hardware level.

As illustrated, a coprocessor interface layer 520 provides the interface between the microkernel 510 and the filter programs 530 that are located at the processing units 110 of FIG. 1. Task applications 540, 550, also have direct access to the filter programs 530 via the interface layer 520. These task applications are illustrated as including user tasks 540, and service tasks 550. User tasks 540 include, for example, a browser application. Service tasks 550 include higher level operating system functions, such as a flash file system, networking, and so on, which are built upon the primitives and base services provided by the microkernel 510.

As noted above, processing intensive tasks are preferably downloaded to the processing units 110 and executed there. A filter preprocessor 560 is preferably built upon conventional C or JAVA programs to extend the syntax to include the capabilities of the filters 115. A compiler 570 allows the code for the filter programs 530 to be generated directly, and easily.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:

1. A scalable home-control system and network, comprising:
   a platform (100) providing for a grouping of processing devices (110), control processors (120), and ancillary units (130) on plug-in cards;
   a plurality of serial data busses (150) disposed in the platform (100) and arranged in parallel as a single, extendable communications backbone for the platform, and such that data traffic can be split across one or more of the serial buses (150), and each serial bus (150) includes a self-timing mechanism to enable bandwidth and data throughput scalability;
   a plurality of plug-in slot connectors with each such slot connected in parallel across each and all of the plurality of serial buses, and thereby provide a hot swappable plug-in point for each plug-in card;
   a bus controller (210) for using one of said serial buses (150) as a control channel, and providing for device allocations to use said control channel to request and be granted the exclusive use of any other of the other serial buses, wherein a resource allocation for one application can be accommodated without impacting any other allocations;
   a bus interface controller (160) provided on said plug-in cards, and providing for the sending and receiving of data over selected ones of said serial buses (150) that have been allocated to it by the bus controller (210);
   a plurality of filter processors (115) disposed in said processing devices (110) and arranged in a routing matrix, and connected to a corresponding bus interface controller (160), herein each filter processor (115) performs a particular task on a data item and passes it to a next filter processor (115) in lock-step fashion; and
   a user interaction device (360) for locally communicating commands and status with a user, and interfaced with at least one of the processing devices(110);
   wherein, such is configured to support legacy devices in existing home control networks.

2. The system and network of claim 1, further comprising:
   an ancillary unit (130) including electro-optic couplers providing for platform extensions to other groupings of processing devices (110), control processors (120), and ancillary units (130) on plug-in cards in other platforms (100).

3. The system and network of claim 1, further comprising:
   a control processor (120) providing for an interface to legacy devices (301-304) to the rest of the system.

4. The system and network of claim 3, further comprising:
   a real-time microkernel (510) included in the control processor (120), and providing for operating system functions that include semaphores, messaging, scheduling, exception and task and memory management, and providing for interfaces to task processors and standard operating systems.

5. The system and network of claim 4, further comprising:
   a coprocessor interface layer (520) that provides the interface between the micromere (510) and any filter programs (530) disposed in said processing devices (110), wherein any task applications (540, 550) have direct access to said filter programs (530) via interface layer (520).

* * * * *